(12) United States Patent
Rozinov

(10) Patent No.: US 8,671,208 B2
(45) Date of Patent: Mar. 11, 2014

(54) SYSTEM AND METHOD FOR ADAPTIVELY ROUTING PEER-TO-PEER (P2P) COMMUNICATIONS

(75) Inventor: Boris Rozinov, Richmond Hill (CA)

(73) Assignee: Blackberry Limited, Waterloo (CA)

( * ) Notice: Subject to any disclaimer, the term of this patent is extended or adjusted under 35 U.S.C. 154(b) by 140 days.

(21) Appl. No.: 13/413,361

(22) Filed: Mar. 6, 2012

(65) Prior Publication Data

US 2013/0238698 A1     Sep. 12, 2013

(51) Int. Cl.
   *G06F 15/16*     (2006.01)
(52) U.S. Cl.
   USPC .......... 709/229; 709/227; 709/223; 709/224; 709/225
(58) Field of Classification Search
   USPC ......... 709/229, 227, 223, 224, 225, 228, 217, 709/204; 370/252; 455/411
   See application file for complete search history.

(56) References Cited

U.S. PATENT DOCUMENTS

| | | | |
|---|---|---|---|
| 6,876,633 | B2 | 4/2005 | Strathmeyer et al. |
| 7,801,986 | B2 | 9/2010 | Lybeck et al. |
| 2005/0108347 | A1 | 5/2005 | Lybeck et al. |
| 2007/0253418 | A1 | 11/2007 | Shiri et al. |
| 2012/0117153 | A1* | 5/2012 | Gunasekar et al. ........... 709/204 |
| 2012/0157059 | A1* | 6/2012 | Raju et al. ..................... 455/411 |
| 2012/0158862 | A1* | 6/2012 | Mosko et al. ................. 709/206 |
| 2012/0166582 | A1* | 6/2012 | Binder .......................... 709/217 |
| 2012/0179829 | A1* | 7/2012 | George ......................... 709/227 |
| 2012/0294160 | A1* | 11/2012 | Erman et al. .................. 370/252 |
| 2013/0067101 | A1* | 3/2013 | Xu et al. ....................... 709/228 |

OTHER PUBLICATIONS

Mellouk, A. et al.; "A new methodology to adapt SIP Protocol for voice traffic transported over IP Network"; Proceedings of the Advanced International Conference on Telecommunications and International Conference on Internet and Web Applications and Services (AICT/ICIW 2006); Feb. 19-26, 2006; Guadelope, French Carribean; IEEE; ISBN: 978-0-7695-2522-8.
Tromparent, M.; Search Report from corresponding European Application No. 12158211.8; search completed Jun. 29, 2012.
Understanding SIP Servers; 2002; RADVISION Ltd.

* cited by examiner

*Primary Examiner* — Le H Luu
(74) *Attorney, Agent, or Firm* — Brett J. Slaney; Blake, Casselss, Graydon LLP

(57) ABSTRACT

Methods and systems for connecting communication devices in a network are provided. A first and a second communication devices are connected to a proxy in the network. The proxy being configured for routing signals between the first and second communication devices. Respective network protection types of the first and second communication devices are determined, and used to determine whether a peer-to-peer connection can be made between the first and second communication devices. If the peer-to-peer connection can be made, the first and second communication devices are enabled to communicate with each other via the peer-to-peer connection. If the peer-to-peer connection cannot be made, the proxy is enabled to continue routing signals between the first and second communication devices.

30 Claims, 8 Drawing Sheets

SYSTEM AND METHOD FOR ADAPTIVELY ROUTING PEER-TO-PEER (P2P) COMMUNICATIONS

TECHNICAL FIELD

The following relates to systems and methods for adaptively routing peer-to-peer (P2P) communications.

DESCRIPTION OF THE RELATED ART

Multimedia communication sessions such as voice and video calls over Internet Protocol (IP) may use defined signaling protocols such as the Session Initiation Protocol (SIP). Such a protocol can be used to create, modify, and terminate two-party (i.e. unicast) or multi-party (i.e. multicast) sessions comprising one or more media streams. Other example uses of protocols such as SIP include, without limitation, video conferencing, streaming multimedia distribution, instant messaging, presence information, file transfer, and online gaming.

Traditional SIP-based solutions such as those implementing voice over IP (VoIP), are either server based, thus using a registrar to identify the users of the system and their states, and a proxy to connect users together; or peer-to-peer (P2P), wherein the central servers are removed and the individual nodes form a mesh network in which any node can be reached from any other node.

Server based solutions for setting up communications sessions are often useful because the registrar and proxy can implement admission control and traffic routing policies which may, for example, mitigate network congestion. On the other hand, once a server based communication session has been established between two end-points, it is often desirable to convert the session to P2P, by removing the proxy from the communication path between the involved end-points. Methods of converting a communication session to P2P in this manner are known. However, while desirable, it is not always possible to remove the proxy from the signaling path. Accordingly, it is common practice for the proxy to apply a SIP Record-Route mechanism that instructs the end-points to use the proxy for the duration of the communication session. This means that the proxy remains in the signaling path for all communication sessions, including those sessions that could, at least on principle, be converted to P2P.

BRIEF DESCRIPTION OF THE DRAWINGS

Embodiments will now be described by way of example only with reference to the appended drawings wherein.

DETAILED DESCRIPTION

Figure 1:
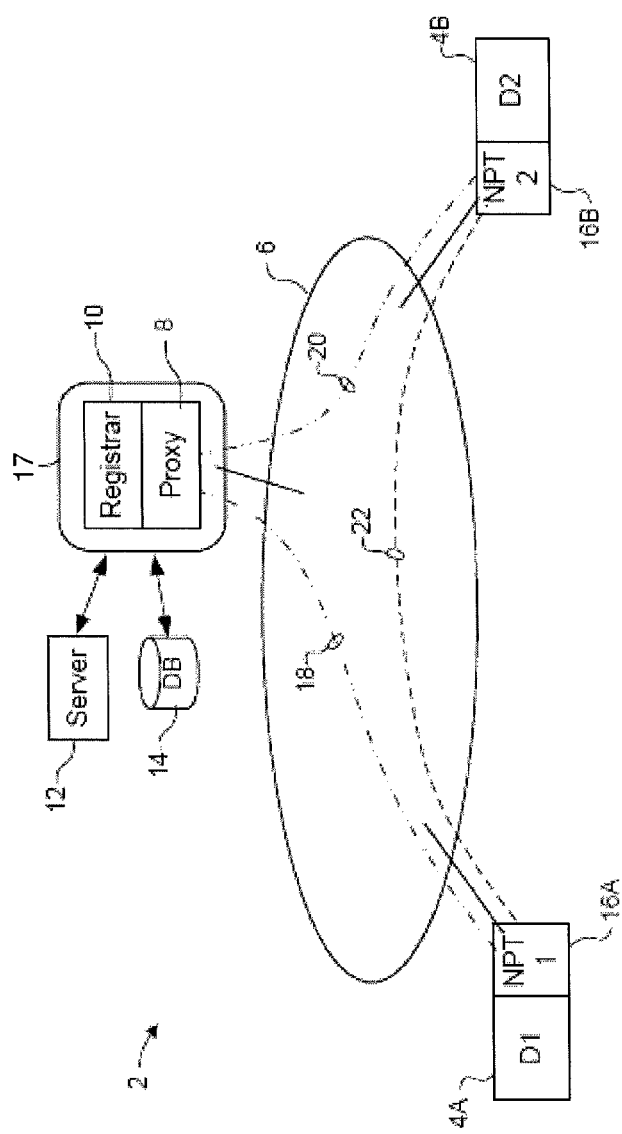
FIG. 1 is a block diagram schematically illustrating a communication network, in accordance with one example of the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

Disclosed herein are techniques by which a proxy can implement an adaptive Record-Route policy such that the proxy may be removed from the signaling path between two end-points.

Accordingly, the following provides a method of connecting communication devices in a network. First and second communication devices are connected to a proxy in the network, the proxy being configured for routing signals between the first and second communication devices. Respective network protection types of the first and second communication devices are determined, and used to determine whether a peer-to-peer (P2P) connection can be made between the first and second communication devices. If the P2P connection can be made, the first and second communication devices are enabled to communicate with each other via the P2P connection. If the P2P connection cannot be made, the proxy is enabled to continue routing signals between the first and second communication devices.

Referring to FIG. 1, there is shown an example communication network 2 including first and second communication devices 4A, 4B connected to a data network 6. A proxy 8, a registrar 10 a server 12 and a location database 14 are also shown connected to the data network 6.

The communication devices 4A, 4B may comprise any combination of hardware and software configured for communication through the data network 6. Representative communication devices 4A, 4B of the type contemplated in this disclosure include, but are not limited to: hand-held communication devices including tablet computers, smart-phones, personal data assistants (PDAs); automated teller machines (ATMs) and point of sale (PoS) terminals; general purpose computers (including desk-top PCs, and servers); and network nodes such as gateways and routers. Each communication device 4A, 4B may be connected to the data network 6 directly, or via one or more other devices such as, for example, routers.

It is contemplated that each communication device 4 is associated with a respective Network Protection Type (NPT) 16. The respective NPT 16 of each communication device may take any desired form including, but not limited to: none; a firewall imposing one or more traffic forwarding policies to and from the respective communication device; and Network Address Translation (NAT). Network nodes such as gateways and routers may also implement a NAT traversal function.

The data network 6 may be any suitable data communications network including, for example, the Internet.

The proxy 8, registrar 10, server 12 and location database 14 are provided by a network service provider to enable the communication device 4A-B to access to communications services of the network 2. It should be noted that the proxy 8, registrar 10, server 12 and location database 14 are functional elements that are illustrated herein as separate devices for convenience of description only. In practice, the proxy 8, registrar 10, server 12 and location database 14 may be provided as any suitable combination of hardware and software including (but not limited to) a set of devices connected to the data network 6 as shown in FIG. 1, a single device (or device cluster, such as a server farm or other cloud computing type configuration) hosting the functionality of the proxy 8, registrar 10, server 12 and location database 14; or a plurality of devices (or device clusters) connected to the data network 6. In some examples, devices (or device clusters) hosting the functionality of the proxy 8, registrar 10, server 12 and location database 14 may be connected to the data network 6 at diverse geographical locations. The proxy 8 and registrar 10 may, for example, comprise an Authentication Server or a Remote Access Server (RAS) 17 configured to negotiate a predetermined registration process with each communication device 4.

Figure 2:
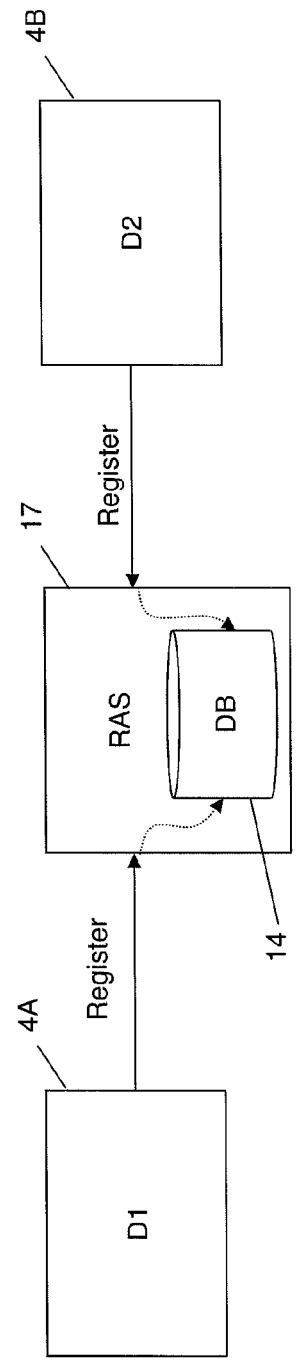
FIG. 2 is a block diagram schematically illustrating an example registration process.

In a common scenario, upon start-up or connection to the network 6, a communication device 4 initiates a communication session with the RAS 17 as shown illustratively in FIG. 2, to complete a registration process. Typically, the registration process requires the communication device 4 to send a packet to the registrar 10 which contains information identifying the communication device 4 (and/or a user associated with the device) and to provide a password or other credentials. Typically, the registrar 10 detects the location of the communication device 4, and records this information in the location database 14 as illustrated in FIG. 2. The location information may, for example, identify an address of the communication device 4; or a network domain in which the communication device 4 is located. Upon completion of the registration process, the registrar 10 enables the communication device 4 to access one or more communications services of the network 2 in accordance with a subscription agreement.

Thus, for example, when communication device D1 (also identified by numeral 4A) wishes to communicate with device D2 (also identified by numeral 4B), for example to establish a multi-media session with that device; the communication device D1 4A forwards a request to the proxy 8. In response to the request, the proxy 8 retrieves location information of device D2 from the location database 14 to make routing decisions and establish respective communication sessions (indicated generally at 18 and 20 in FIG. 1) with both of the communications devices D1 and D2, and installs a packet routing function to transfer packets between the two devices. As a result, D1 is able communicate with D2, with the associated packet flows being routed through the data network 6 via the proxy 8. Those of ordinary skill in the art will recognize that Session Initiation Protocol (SIP), well known in the art, may be used to facilitate interactions between the communications devices 4, the proxy 8, the registrar 10 and the server 12 to set up the communications sessions 18, 20 and install the necessary traffic forwarding function(s) in the proxy 8.

In examples in which SIP is used in this manner, the proxy 8 typically implements a Record-Route policy to instruct each communication device 4 to forward packets destined for the other communication device to the proxy 8. Typically, this Record-Route policy will be maintained for at least the duration of the session between the two communication devices 4.

It is frequently desirable to enable the two communication devices 4 to interact directly, via a P2P connection 22 through the data network 6. One benefit of using a P2P connection is that traffic forwarding resources of the proxy 8 can then be released and used to handle other sessions.

In order to retain the benefits of authentication services and location information afforded by the registrar 10, server 12 and location database 14, it may be convenient to use the above-described method to initially establish communication between the communication devices via the proxy 8, and then, once the session has been established, remove the proxy 8 from the signaling path and enable the two communication devices 4 to continue the session using the P2P connection 22. Methods for continuing the session using the P2P connection 22 are known in the art, and thus will not be described in detail herein.

Figure 3:
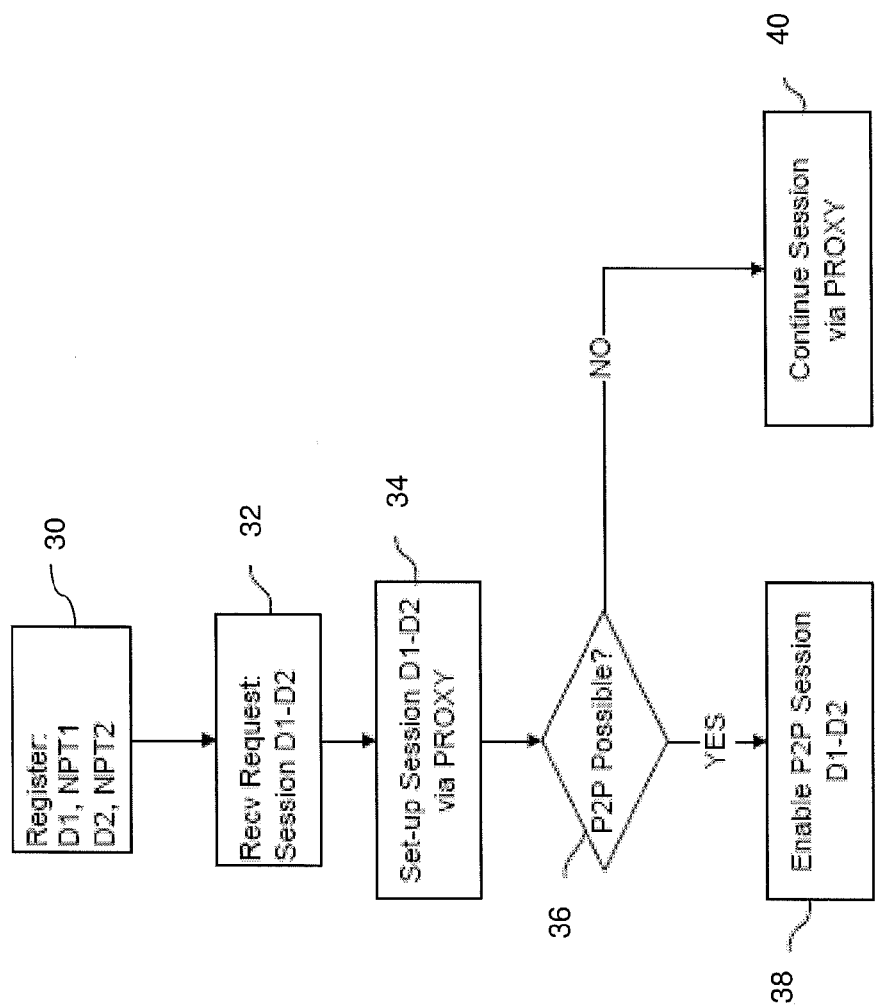
FIG. 3 is a flow-chart illustrating principle steps in a method of connecting devices in the network of FIG. 1, in accordance with one example of the present disclosure.
Figure 4:
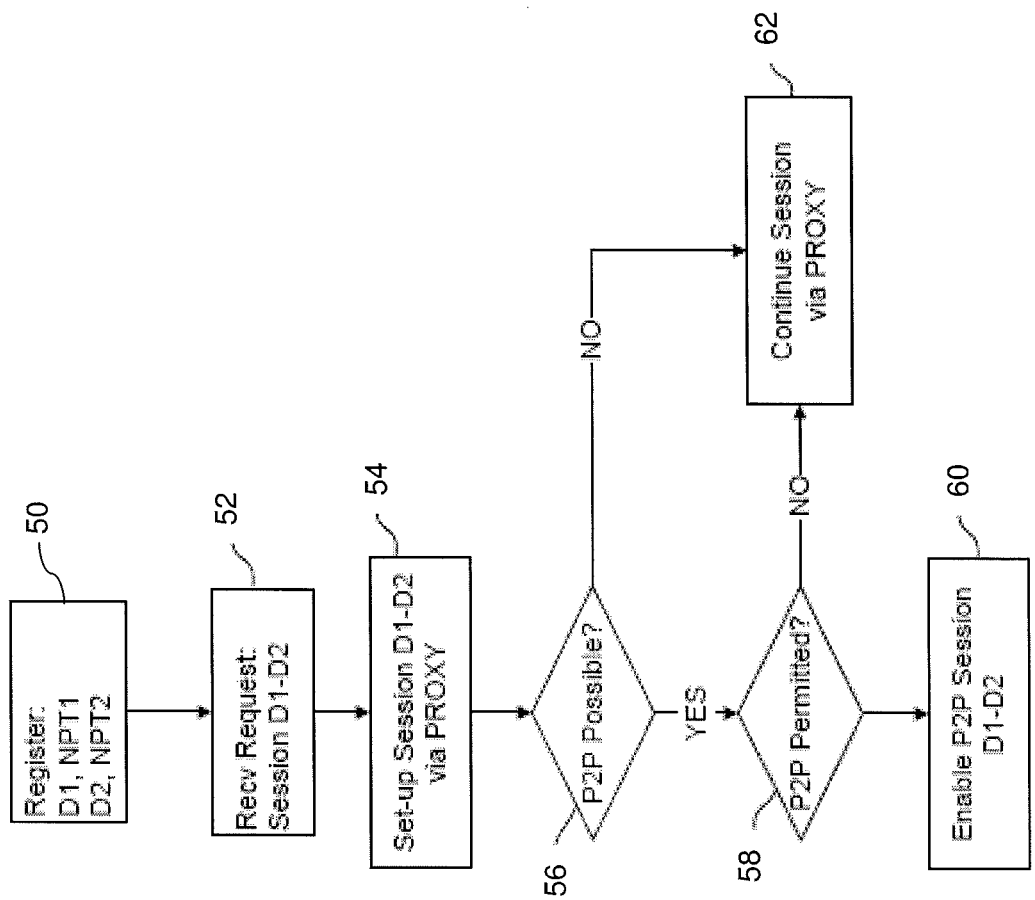
FIG. 4 is a flow-chart illustrating principle steps in a second method of connecting devices in the network of FIG. 1, in accordance with one example of the present disclosure.

The applicants have recognized that, while it is often desirable to remove the proxy 8 from the communication session, this removal is not always possible. One reason for not being possible, is an incompatibility between the respective network protection types 16 associated with each communication device 4. Accordingly, the server 12 may determine whether or not a P2P connection 22 can be set up between the two communication devices D1 and D2, based on information regarding the respective network protection type 16 associated with each communication device 4. The information may comprise any suitable data including, but not limited to: a type of firewall and/or policies implemented by the firewall; and a type of Network Address Translation (NAT). Other information characterizing the network protection implemented in respect of the associated communication device 4 may also be included, as desired. In some examples, the information regarding the respective network protection type 16 is passed to the server 12 during registration of the communication devices 4, e.g., subsequent to the registration shown in FIG. 2. Alternatively, the information may be contained in a request message sent from a first communication device and requesting the initiation of a communication session with the other communication device. In either example, the information can be stored in a memory (not shown) accessible by the server 12 and used to control the connections between the two communication devices. FIGS. 3 and 4 are flow charts illustrating respective possible connection scenarios.

Referring to FIG. 3, there is shown a first connection scenario, in which the two communication devices 4A, 4B register at 30 with the registrar 10, in order to obtain access to communication services of the network 2. As part of the registration process, each communication device 4A, 4B provides information identifying its respective location and network protection type 16. Subsequent to registration, the proxy 8 receives, at 32, a request message from a first communication device, for example D1, to request initiation of a communication session with the other communication device, in this example, D2. Upon receipt of the request message, the proxy 8 interacts with the registrar 10, the server 12, the location database 14 and the two communication devices 4A, 4B to establish, at 34, the requested session, as described above, with traffic forwarding via the proxy 8. Known SIP server-based solutions may be used for this purpose.

At 36, the server 12 determines whether or not it is possible to make a P2P connection 22 between the two communication devices 4, based on the previously received information regarding the respective network protection type 16 associated with each communication device 4. In some examples, the server 12 may determine that the P2P connection 22 can be made if the respective network protection types 16 associated with the communication devices 4 comprise a common firewall. In some examples, the server 12 may determine that the P2P connection 22 can be made if the respective network protection types 16 associated with the communication devices 4 comprise a restrictive NAT. It is contemplated that the information regarding the respective network protection type 16 associated with each communication device 4 can be analyzed to identify other conditions under which it will be possible to make a P2P connection 22 between the two communication devices.

Returning to FIG. 3, if it is determined, at 36, that a P2P connection 22 can be made, the server 12 operates, at 38, to enable the communication devices 4A, 4B to continue communicating with each other via the P2P connection 22. In some examples, this may be accomplished by the server 12 interacting with the proxy 8 and/or the two communication devices 4A, 4B to: set up the P2P connection 22; redirect packet flows of the session through the P2P connection 22; and eliminate the connections 18 and 20 between the two communication devices 4A, 4B and the proxy 8. Other suitable processes may be used, if desired.

On the other hand, if it is determined, at 36, that a P2P connection 22 can not be made, the server 12 operates, at 40, to force communication between the two communication devices 4A, 4B to continue with packet flows being routed through the proxy 8. In some examples, this may be accomplished by the server 12 interacting with the proxy 8 to cause the proxy 8 to implement a SIP Record-Route policy instructing each communication device 4 to continue forwarding packets destined for the other of the communication devices 4 to the proxy 8 for forwarding.

The method described above with reference to FIG. 3 enables the server 12 to set up P2P connection whenever the respective network protection types 16 associated with the involved communication devices will permit such a connection. However, there are some circumstances when the use of a P2P connection may not be permitted, even if such a connection can be made. For example, where one of the communication devices 4 is associated with a predetermined user or organization, it may be desired to ensure that all traffic to and from that device is routed through the proxy 8. Similarly, where one of the communication devices 4 is located with a predetermined network domain, it may be necessary to force all traffic to and from that device to be routed through the proxy 8. In another example, if a predetermined portion of signaling between the two communication devices is to be recorded, or if one of the communication devices 4 requests a predetermined type of data, then it may be important to route at least some of the signaling of the communication session through the proxy 8. It is possible that the decision of whether to force traffic through the proxy 8 may be driven by a predetermined combination of conditions. For example, the combination of the geographical location of a communication device and the type of data (or communication session) requested, may determine whether or not traffic to and from that device must be routed through the proxy 8. FIG. 4 illustrates one possible approach for addressing this requirement.

In the example shown in FIG. 4, the communication devices 4, proxy 8, registrar 10 and server 12 may operate as described above with reference to FIG. 3 to register the communication devices 4, at 50, receive a request message, at 52, initiate a communication session, at 54, between the two communication devices with traffic forwarding via the proxy 8, and determine, at 56, whether or not a P2P connection 22 can be made between the two communication devices 4A, 4B, based on the respective network protection type 16 of each communication device 4. The difference between the example shown in FIG. 3, and the example shown in FIG. 4, is that, in the example shown in FIG. 4, if it is determined, at 56, that a P2P connection 22 can be made, the server 12 then determines, at 58, whether or not such a P2P connection is permitted. Any one or more of the criteria described above may be used, alone or in combination, to make this determination. If a P2P connection 22 is permitted, then the server 12 may proceed, at 60, to enable the communication devices 4A, 4B to continue communicating with each other via the P2P connection 22 as described above with reference to FIG. 3. Similarly, if a P2P connection is not permitted, then the server 11 may proceed, at 62, to force communication between the two communication devices 4A, 4B to continue with packet flows being routed through the proxy 8, again as described above with reference to FIG. 3.

It will be appreciated that the examples described above may be varied without departing from the intended scope of the appended claims. For example, in the example of FIG. 4, the determination of whether or not a P2P connection is permitted is made after the determination that the P2P connection is possible. Naturally, the order in which these two determinations are made can be reversed. Similarly, either (or both) of these determinations may be made before, or at the same time as, establishing the session through the proxy 8.

The foregoing examples describe scenarios involving two communication devices 4A, 4B, and the connections 18, 20, and 22 between them. However, it will be appreciated that these same techniques can be readily extended to scenarios in which it is desired to establish communications sessions between more than two communication devices 4, if desired.

The foregoing examples describe scenarios in which a new communication session is being set up between the involved communication devices. Thus, for example, the operations shown in FIGS. 3 and 4 begin with a first communication device sending a request message to the proxy 8 to initial a new communication session with the other communication device. However, it will be appreciated that the disclosed techniques may also be applied to scenarios in which a communication device wishes to join a communication session that is already in progress. Similarly, the disclosed techniques may also be applied to scenarios in which the status (such as the location) of one of the communication devices changes during the course of a communication session, so that the server 12 may re-analyze whether or not a P2P connection 22 is possible and/or permitted.

Figure 5:
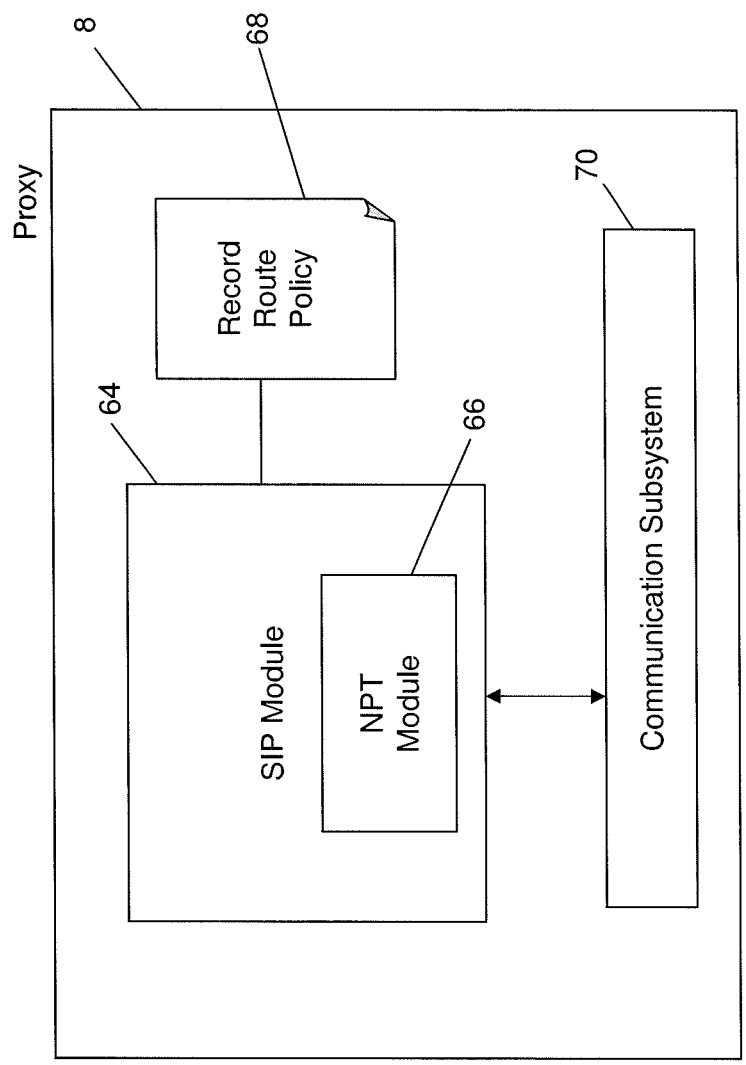
FIG. 5 is a block diagram schematically illustrating an example configuration for a proxy.

Turning now to FIG. 5, shown therein is an example of a configuration for a proxy 8 operable to utilize SIP techniques for making routing decisions and establish respective communication sessions with both of the communications devices D1 and D2, and installing a packet routing function to transfer packets between the two devices. In the example shown in FIG. 5, the proxy 8 includes a SIP module 64 programmed or otherwise operable to apply SIP-based instructions for routing communications. The SIP module 64 includes (as shown) or otherwise has access to an NPT module 66 for determining whether or not the devices D1 and D2 can communicate with each other directly in a P2P session. The SIP module 64 also includes or otherwise has access to a record route policy 68, which may be applied in scenarios wherein traffic is to be directed through the proxy 8. The proxy 8 also includes a communication subsystem 70 to enable the proxy 8 to access, send, and receive data over the network 6.

Figure 6:
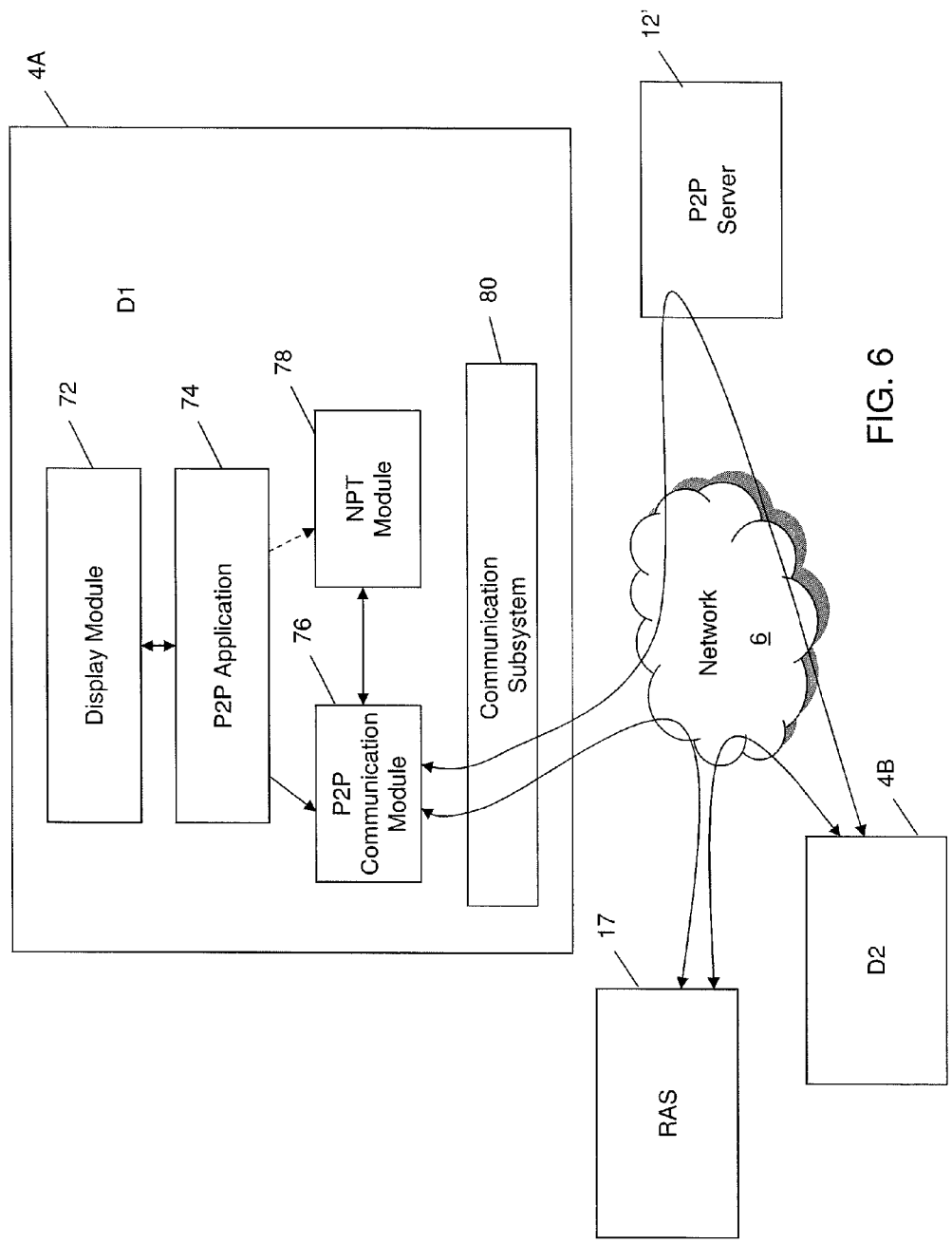
FIG. 6 is a block diagram schematically illustrating an example configuration for a communication device.

FIG. 6 illustrates an example configuration for a communication device 4, in this example D1. D1 in the example configuration comprises a P2P application 74, e.g., VoIP application, IM application, gaming application, file transfer application/module, application enabling multimedia streaming, etc. The P2P application 74 may have a user interface (UI) aspect for interfacing with a user via a display module 72. The P2P application 74 comprises or communicates with (as shown) a P2P communication module 76, which is used to establish a P2P connection as described above. D1 interfaces with the network 6 via a communication subsystem 80 for communicating with, for example, the RAS 17, a P2P server 12', and other communication devices 4, such as D2. The P2P application 74 or P2P communication module 76 comprises or communicates with (as shown) an NPT module 78, which enables the P2P application 74 or P2P communication module 76 to obtain NPT information for the RAS 17, e.g., via the communication subsystem 80. It can be appreciated that the P2P application 74, P2P communication module 76, and NPT module 78 are shown as separate modules or components for illustrative purposes only and in other embodiments they may be provided by a common module, e.g., as a component or module of the P2P application 74, etc.

Although the principles discussed below are applicable to any communication device 4, examples below will be provided for a mobile communication device, which is one of many types of electronic communication devices.

For clarity in the discussion below, mobile communication devices may be commonly referred to as "mobile devices" for brevity. Examples of applicable mobile devices may include, without limitation, cellular phones, smart-phones, wireless organizers, pagers, personal digital assistants, handheld or other wireless communication devices, wirelessly enabled notebook computers, portable gaming devices, tablet computers, or any other portable electronic device with processing and communication capabilities.

Figure 7:
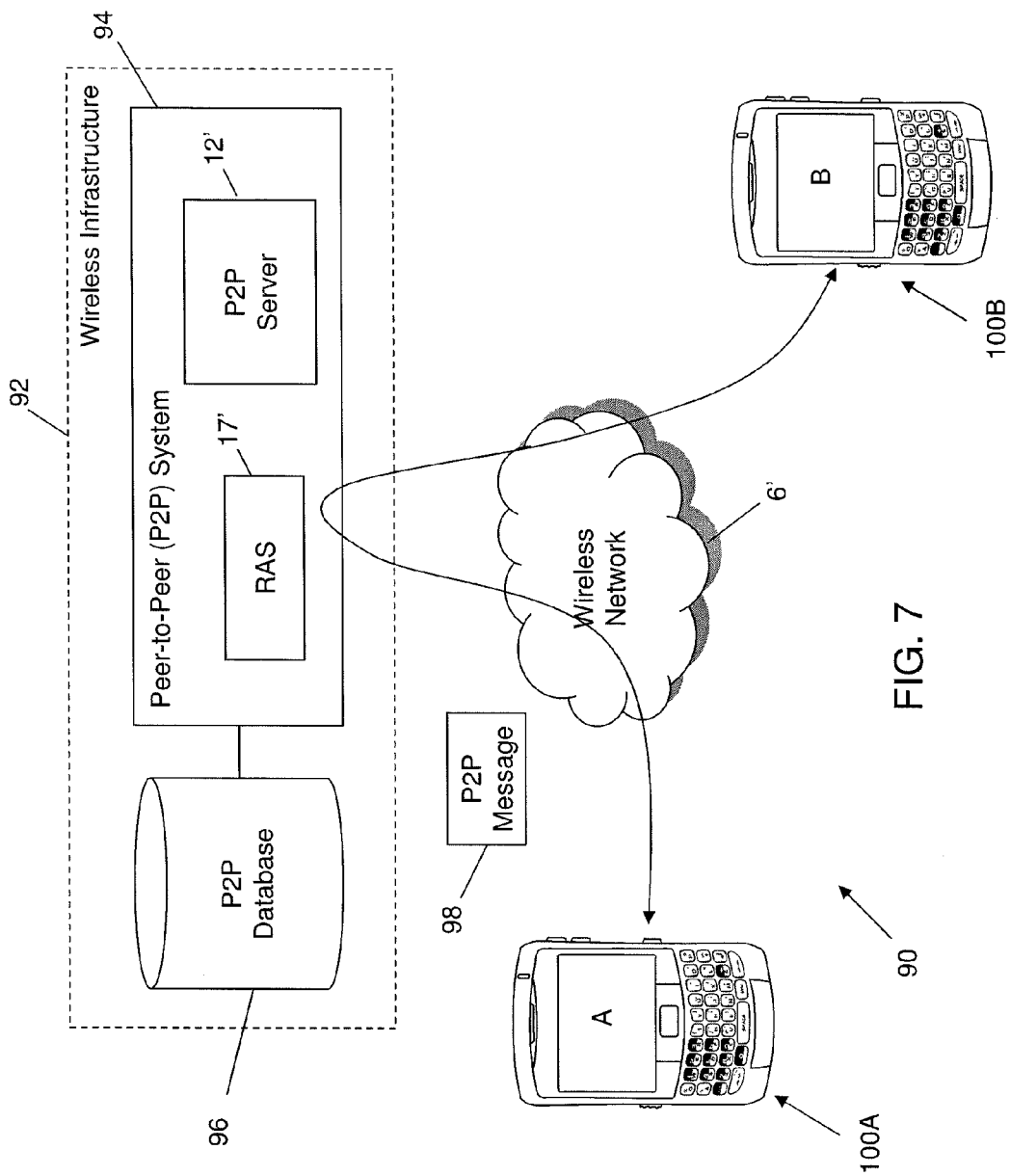
FIG. 7 is a block diagram of an example wireless communication system comprising a peer-to-peer (P2P) system, the P2P system comprising a Remote Access Server (RAS) and P2P server.

Turning to FIG. 7, an example communication system 90 is shown. The communication system 90 in this example, at least in part, enables mobile devices, commonly referred to by numeral 100 (or using numeral 100 as a prefix—e.g., mobile device A, also denoted by 100A and mobile device B, also denoted by 100B), to communicate via a peer-to-peer (P2P) system 94 via a wireless network 6'. It will be appreciated that two mobile devices 100A, 100B shown in FIG. 7 are for illustrative purposes only and many other mobile devices 100 (not shown) may also be capable of communicating with or within the communication system 90. It will also be appreciated that although the examples shown herein are directed to mobile communication devices, the same principles may apply to other devices capable of communicating with the P2P system 94. For example, an application (not shown) hosted by a desktop computer or other "non-portable" or "non-mobile" device may also be capable of communicating with other devices (e.g. including mobile devices 100) using the P2P system 94.

The P2P system 94 is, in this example, a component of a wireless infrastructure 92 associated with the wireless network 6'. The wireless infrastructure 92 in this example comprises, in addition to the P2P system 94, and among other things not shown for simplicity, a P2P database 96. The P2P database 96 in this example is used to store one or more personal identification numbers (PINs) associated with particular mobile devices 100, whether they are subscribers to a service provided by the wireless infrastructure 92 or otherwise.

The mobile device 100A may communicate with the mobile device 100B and vice versa via the P2P system 94, in order to perform P2P messaging or to otherwise exchange P2P-based communications, as will be explained in greater detail below. For ease of explanation, in the following examples, any P2P-based communication may also be referred to as a P2P message 98 as shown in FIG. 7.

As can be seen in FIG. 7, the P2P system 94 in this example can host or otherwise provide the capabilities of an RAS 17' according to the principles discussed above. In this way, an existing component of the wireless infrastructure 92 can be used to enable the P2P communications in the way described above. In such an example, a P2P server 12' that is connectable to the wireless network 6' can be communicated with by the mobile devices 100A, 100b in order to participate in a P2P session. The wireless infrastructure 92 may also or instead include or otherwise provide the P2P server 12'.

In another example, the mobile device 100 may be one that is used in a system that is configured for continuously routing all forms of pushed information from a host system 104 to the mobile device 100. One example of such a system will now be described making reference to FIG. 8.

Figure 8:
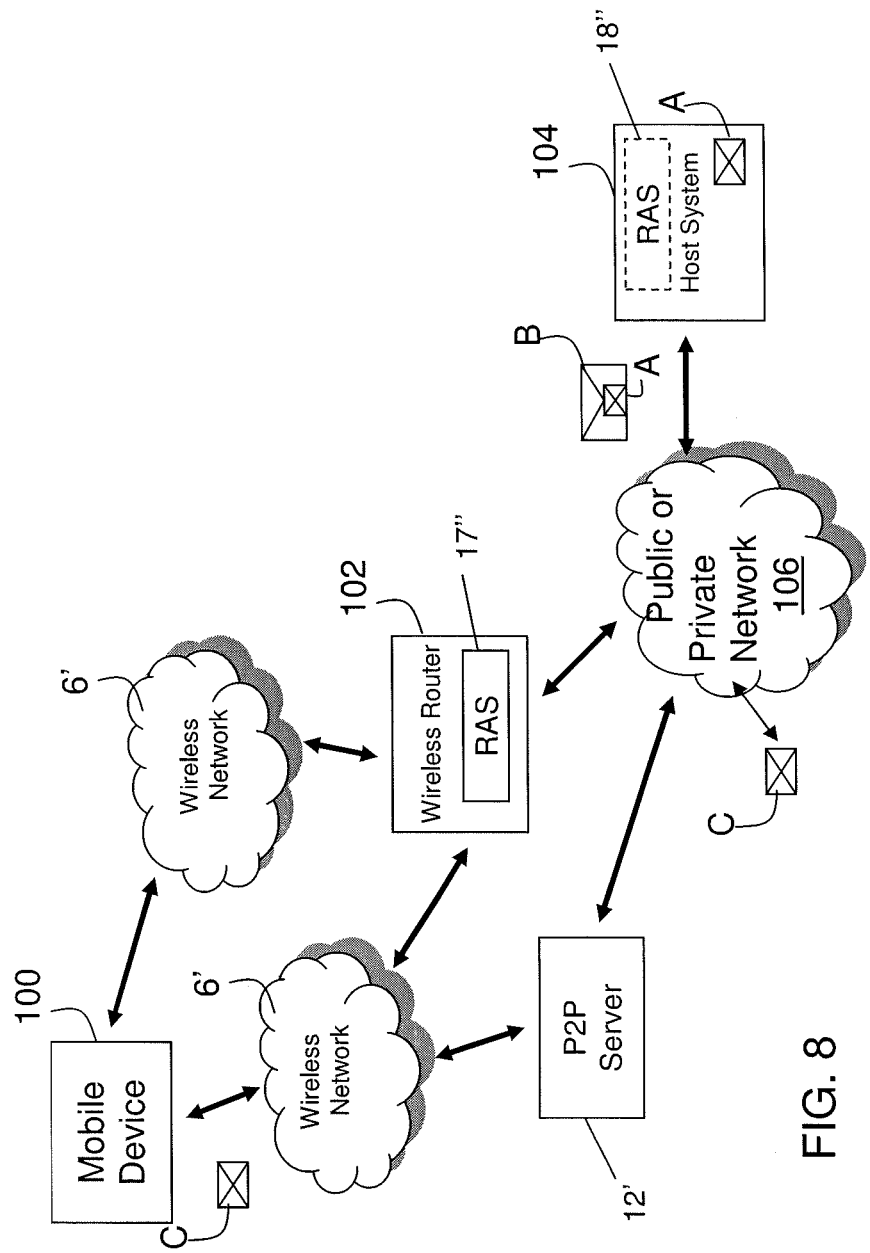
FIG. 8 is a system diagram illustrating an example environment in which data items are pushed from a host system to a mobile device, a router in such environment or the host system comprising an RAS and P2P server.

FIG. 8 is an example system diagram showing the redirection of user data items (such as message A or C) from a corporate enterprise computer system (host system) 104 to the user's mobile device 100 via a wireless router 102. The wireless router 102 provides the wireless connectivity functionality as it acts to both abstract most of the wireless network's 6' complexities, and it also implements features necessary to support pushing data to the mobile device 100. Although not shown, a plurality of mobile devices may access data from the host system 104. In this example, message A in FIG. 8 represents an internal message sent from, e.g., a desktop computer within the host system 104, to any number of server computers in a corporate network (e.g. LAN), which may, in general, include a database server, a calendar server, an E-mail server, a voice-mail server, etc.

As can be seen in FIG. 8, the wireless router 102 can be configured to include or otherwise provide an RAS 17" or components or modules capable of providing similar services. The RAS 17" could also be included in or be provided by the host system 104. A P2P server 12' is also shown in FIG. 8 which can be communicated with via the wireless network 6' or a public or private network 106 or both. Therefore, it can be appreciated that the principles discussed above in connection with FIGS. 1 to 6 may be applied to any communication system comprising an entity capable of providing proxy or server like functionality.

Message C in FIG. 8 represents an external message from a sender that is not directly connected to the host system 104, such as the user's mobile device 100, some other user's mobile device (not shown), or any user connected to the public or private network 106 (e.g. the Internet). Message C could be e-mail, voice-mail, an IM, calendar information, database updates, web-page updates or could even represent a command message from the user's mobile device 100 to the host system 104. The host system 104 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall.

The mobile device 100 may be adapted for communication within wireless network 6' via wireless links, as required by each wireless network 6' being used. As an illustrative example of the operation for a wireless router 102 shown in FIG. 8, consider a data item A, repackaged in outer envelope B (the packaged data item A now referred to as "data item (A)") and sent to the mobile device 100 from an Application Service Provider (ASP) in the host system 104. Within the ASP is a computer program, similar to a wireless mobility agent, running on any computer in the ASP's environment that is sending requested data items from a data store to a mobile device 100. The mobile-destined data item (A) is routed through the network 106, and through the wireless router's firewall (not shown) protecting the wireless router 102.

Although the above describes the host system 104 as being used within a corporate enterprise network environment, this is just one example of one type of host service that offers push-based messages for a handheld wireless device that is capable of notifying and preferably presenting the data to the user in real-time at the mobile device when data arrives at the host system 104.

By offering a wireless router 102 (sometimes referred to as a "relay"), there are a number of major advantages to both the host system 104 and the wireless network 6'. The host system 104 in general runs a host service that is considered to be any computer program that is running on one or more computer systems. The host service is said to be running on a host system 104, and one host system 104 can support any number of host services. A host service may or may not be aware of the fact that information is being channeled to mobile devices 100. For example an e-mail or message program might be receiving and processing e-mail while an associated program (e.g., an e-mail wireless mobility agent) is also monitoring the mailbox for the user and forwarding or pushing the same e-mail to a wireless device 100. A host service might also be modified to prepared and exchange information with mobile devices 100 via the wireless router 102, like customer relationship management software. In a third example, there might be a common access to a range of host services. For example a mobility agent might offer a Wireless Access Protocol (WAP) connection to several databases.

In data messaging environments, the wireless router 102 may abstract the mobile device 100 and wireless network 6', offer push services to standard web-based server systems and allow a host service in a host system 104 to reach the mobile device 100 in many countries.

The host system 104 shown herein has many methods when establishing a communication link to the wireless router 102. For one skilled in the art of data communications the host system 104 could use connection protocols like TCP/IP, X.25, Frame Relay, ISDN, ATM or many other protocols to establish a point-to-point connection.

The wireless router 102 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like Enhanced Data Rates for GSM Evolution (EDGE), Universal Mobile Telecommunications System (UMTS) and High-Speed Downlink Packet Access (HSDPA), Long Term Evolution (LTE), Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 104, the wireless router 102 may implement a set of defined functions. It can be appreciated that one could select many different hardware configurations for the wireless router 102; however, many of the same or similar set of features would likely be present in the different configurations.

Accordingly, there is provided a method of connecting communication devices in a network, the method comprising: connecting a first communication device and a second communication device to a proxy in the network, the proxy being configured for routing signals between the first and second communication devices; determining respective network protection types of the first and second communication devices; determining whether a peer-to-peer connection can be made between the first and second communication devices using the respective network protection types of the first and second communication devices; if the peer-to-peer connection can be made, enabling the first and second communication devices to communicate with each other via the peer-to-peer connection; and if the peer-to-peer connection cannot be made, enabling the proxy to continue routing signals between the first and second communication devices.

There is also provided a server operable to manage connections between communication devices in a network, the server executing computer executable instructions for: connecting a first and a second communication devices to a proxy in the network, the proxy being configured for routing signals between the first and second communication devices; determining respective network protection types of the first and second communication devices; determining whether a peer-to-peer connection can be made between the first and second communication devices using the respective network protection types of the first and second communication devices; if the peer-to-peer connection can be made, enabling the first and second communication devices to communicate with each other via the peer-to-peer connection; and if the peer-to-peer connection cannot be made, enabling the proxy to continue routing signals between the first and second communication devices.

There is also provided a non-transitory computer readable storage medium comprising computer executable instructions for: connecting a first and a second communication devices to a proxy in the network, the proxy being configured for routing signals between the first and second communication devices; determining respective network protection types of the first and second communication devices; determining whether a peer-to-peer connection can be made between the first and second communication devices using the respective network protection types of the first and second communication devices; if the peer-to-peer connection can be made, enabling the first and second communication devices to communicate with each other via the peer-to-peer connection; and if the peer-to-peer connection cannot be made, enabling the proxy to continue routing signals between the first and second communication devices.

Figure 9:
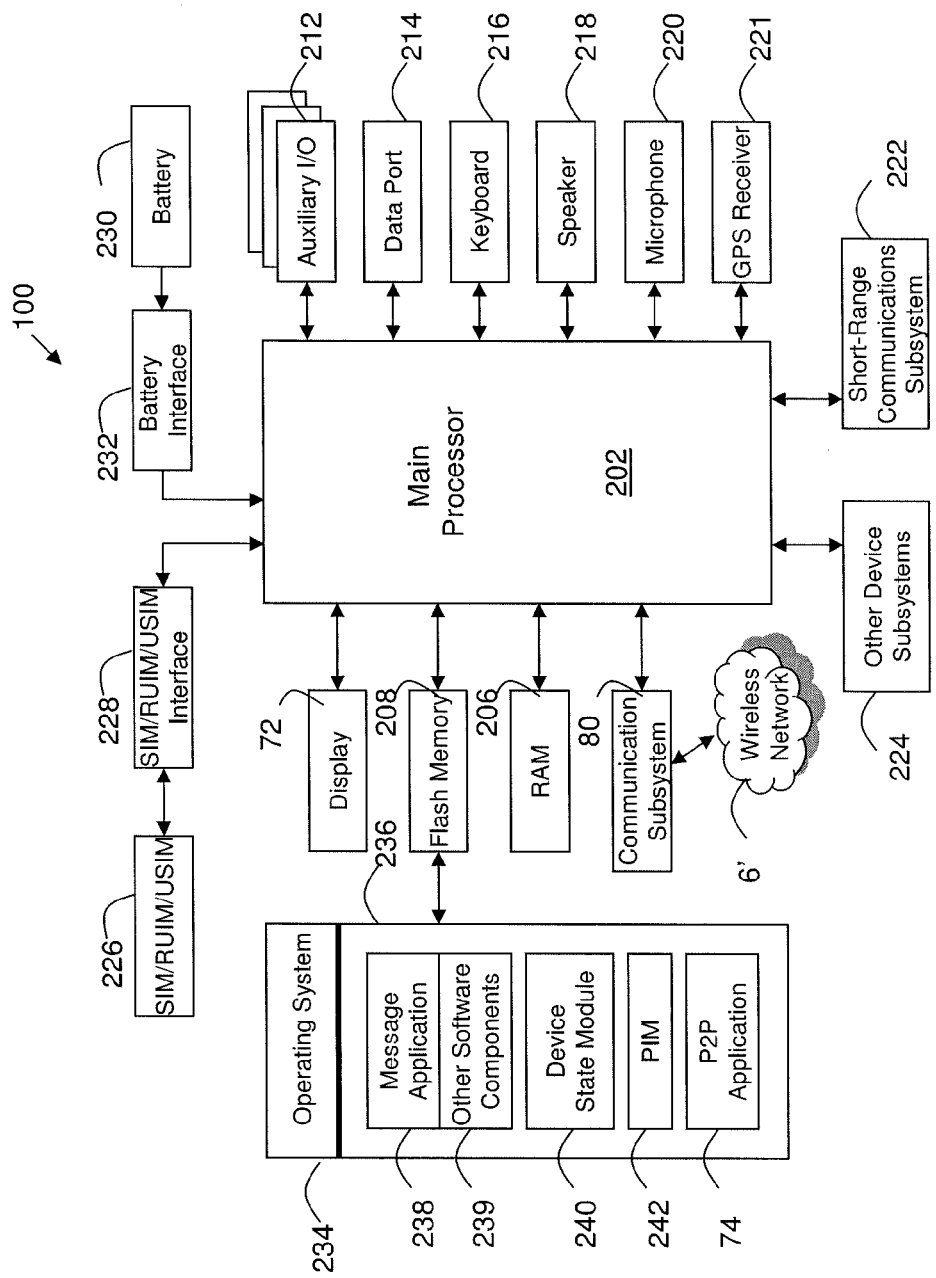
FIG. 9 is a block diagram of an example configuration for a mobile device.

Referring now to FIG. 9, shown therein is a block diagram of an example of a mobile device 100. The mobile device 100 comprises a number of components such as a main processor 202 that controls the overall operation of the mobile device 100. Communication functions, including data and voice communications, are performed through a communication subsystem 80. The communication subsystem 80 receives messages from and sends messages to a wireless network 6'. In this example of the mobile device 100, the communication subsystem 48 is configured in accordance with the GSM and GPRS standards. The GSM/GPRS wireless network is used worldwide and it is expected that these standards will be superseded eventually by 3G and 4G networks such as EDGE, UMTS and HSDPA, LTE, Wi-Max etc. The wireless link connecting the communication subsystem 80 with the wireless network 6' represents one or more different Radio Frequency (RF) channels, operating according to defined protocols specified for GSM/GPRS communications. With newer network protocols, these channels are capable of supporting both circuit switched voice communications and packet switched data communications.

The main processor 202 also interacts with additional subsystems such as a Random Access Memory (RAM) 206, a flash memory 208, a display 72, an auxiliary input/output (I/O) subsystem 212, a data port 214, a keyboard 216, a speaker 218, a microphone 220, GPS receiver 221, short-range communications subsystem 222 and other device subsystems 224.

Some of the subsystems of the mobile device 100 perform communication-related functions, whereas other subsystems may provide "resident" or on-device functions. By way of example, the display 72 and the keyboard 216 may be used for both communication-related functions, such as entering a text message for transmission over the wireless network 6', and device-resident functions such as a calculator or task list.

The mobile device 100 can send and receive communication signals over the wireless network 6' after required network registration or activation procedures have been completed. Network access is associated with a subscriber or user of the mobile device 100. To identify a subscriber, the mobile device 100 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 226 is to be inserted into a SIM/RUIM/USIM interface 228 in order to communicate with a network. The SIM/RUIM/USIM component 226 is one type of a conventional "smart card" that can be used to identify a subscriber of the mobile device 100 and to personalize the mobile device 100, among other things.

The mobile device 100 is typically a battery-powered device and includes a battery interface 232 for receiving one or more batteries 230 (typically rechargeable). In at least some embodiments, the battery 230 can be a smart battery with an embedded microprocessor. The battery interface 232 is coupled to a regulator (not shown), which assists the battery 230 in providing power V+ to the mobile device 100. Although current technology makes use of a battery, future technologies such as micro fuel cells may provide the power to the mobile device 100.

The mobile device 100 also includes an operating system 234 and software components 236 to 246 which are described in more detail below. The operating system 234 and the software components 236 to 246 that are executed by the main processor 202 are typically stored in a persistent store such as the flash memory 208, which may alternatively be a read-only memory (ROM) or similar storage element (not shown). Those skilled in the art will appreciate that portions of the operating system 234 and the software components 236 to 246, such as specific device applications, or parts thereof, may be temporarily loaded into a volatile store such as the RAM 206. Other software components can also be included, as is well known to those skilled in the art.

The subset of software applications 236 that control basic device operations, including data and voice communication applications, may be installed on the mobile device 100 during its manufacture. Other software applications include a message application 238 that can be any suitable software program that allows a user of the mobile device 100 to send and receive electronic messages. Various alternatives exist for the message application 238 as is well known to those skilled in the art. Messages that have been sent or received by the user are typically stored in the flash memory 208 of the mobile device 100 or some other suitable storage element in the mobile device 100. In at least some embodiments, some of the sent and received messages may be stored remotely from the mobile device 100 such as in a data store of an associated host system that the mobile device 100 communicates with.

The software applications can further comprise a device state module 240, a Personal Information Manager (PIM) 242, and other suitable modules (not shown). The device state module 240 provides persistence, i.e. the device state module 240 ensures that important device data is stored in persistent memory, such as the flash memory 208, so that the data is not lost when the mobile device 100 is turned off or loses power.

The PIM 242 includes functionality for organizing and managing data items of interest to the user, such as, but not limited to, e-mail, IM, contacts, calendar events, voice mails, appointments, and task items. A PIM application has the ability to send and receive data items via the wireless network 6'. PIM data items may be seamlessly integrated, synchronized, and updated via the wireless network 6' with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 may also comprise a P2P application 74 as discussed above.

Other types of software applications or components 239 can also be installed on the mobile device 100. These software applications 239 can be pre-installed applications (i.e. other than message application 238) or third party applications, which are added after the manufacture of the mobile device 100. Examples of third party applications include games, calculators, utilities, etc.

The additional applications 239 can be loaded onto the mobile device 100 through at least one of the wireless network 6', the auxiliary I/O subsystem 212, the data port 214, the short-range communications subsystem 222, or any other suitable device subsystem 224. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 214 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 214 can be any suitable port that enables data communication between the mobile device 100 and another computing device. The data port 214 can be a serial or a parallel port. In some instances, the data port 214 can be a USB port that includes data lines for data transfer and a supply line that can provide a charging current to charge the battery 230 of the mobile device 100.

The short-range communications subsystem 222 provides for communication between the mobile device 100 and different systems or devices, without the use of the wireless network 6'. For example, the subsystem 222 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 80 and input to the main processor 202. The main processor 202 may then process the received signal for output to the display 72 or alternatively to the auxiliary I/O subsystem 212. A subscriber may also compose data items, such as e-mail messages, for example, using the keyboard 216 in conjunction with the display 72 and possibly the auxiliary I/O subsystem 212. The auxiliary subsystem 212 may comprise devices such as: a touch-sensitive screen, mouse, track ball, optical trackpad, infrared fingerprint detector, or a roller wheel with dynamic button pressing capability. The keyboard 216 is an alphanumeric keyboard and/or telephone-type keypad. However, other types of keyboards may also be used, such as a virtual or "soft" keyboard rendered as images on a touch screen. A composed item may be transmitted over the wireless network 6' through the communication subsystem 80.

For voice communications, the overall operation of the mobile device 100 in this example is substantially similar, except that the received signals are output to the speaker 218, and signals for transmission are generated by the microphone 220. Alternative voice or audio I/O subsystems, such as a voice message recording subsystem, can also be implemented on the mobile device 100. Although voice or audio signal output is accomplished primarily through the speaker 218, the display 72 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100, any component of or related to the wireless infrastructure 52, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of connecting communication devices in a network, the method comprising:
    connecting a first communication device and a second communication device to a proxy in the network, the proxy being configured for routing signals between the first and second communication devices;
    determining respective network protection types of the first and second communication devices;
    determining whether a peer-to-peer connection can be made between the first and second communication devices using the respective network protection types of the first and second communication devices;
    if the peer-to-peer connection can be made, enabling the first and second communication devices to communicate with each other via the peer-to-peer connection; and
    if the peer-to-peer connection cannot be made, enabling the proxy to continue routing signals between the first and second communication devices.

2. The method of claim 1, wherein the first and second communication devices execute a registration process with a server in the network, and wherein the server determines the respective network protection type of each communication device based on information received from the first and second communication devices during the registration process.

3. The method of claim 2, wherein the respective network protection type of each communication device comprises a firewall.

4. The method claim 3, wherein the server determines that a peer-to-peer connection can be made if the respective network protection types comprise a common firewall.

5. The method of claim 2, wherein the respective network protection type of each communication device comprises a Network Address Translation.

6. The method claim 5, wherein the server determines that a peer-to-peer connection can be made if the respective network protection types comprise a restrictive Network Address Translation.

7. The method of claim 2, wherein the server determines whether a peer-to-peer connection can be made during initiation of a communication session between the first and second communication devices.

8. The method of claim 1, wherein enabling the proxy to continue routing signals between the first and second communication devices comprises the proxy applying a session initiation protocol record route policy.

9. The method of claim 1, further comprising: if the peer-to-peer connection can be made, enabling the proxy to continue routing signals between the first and second communication devices if at least one criterion is satisfied.

10. The method of claim 9, wherein the at least one criterion comprises any one or more of:
    at least one of the first and second communication devices is associated with a predetermined user;
    at least one of the first and second communication devices is located within a predetermined network domain;
    a predetermined portion of signaling between the first and second communication devices is to be recorded; and at least one of the first and second communication devices requests a predetermined type of data.

11. A server operable to manage connections between communication devices in a network, the server executing computer executable instructions for:
   connecting a first and a second communication devices to a proxy in the network, the proxy being configured for routing signals between the first and second communication devices;
   determining respective network protection types of the first and second communication devices;
   determining whether a peer-to-peer connection can be made between the first and second communication devices using the respective network protection types of the first and second communication devices;
   if the peer-to-peer connection can be made, enabling the first and second communication devices to communicate with each other via the peer-to-peer connection; and
   if the peer-to-peer connection cannot be made, enabling the proxy to continue routing signals between the first and second communication devices.

12. The server of claim 11, wherein the first and second communication devices execute a registration process with a server in the network, and wherein the server determines the respective network protection type of each communication device based on information received from the first and second communication devices during the registration process.

13. The server of claim 12, wherein the respective network protection type of each communication device comprises a firewall.

14. The server of claim 13, wherein the server determines that a peer-to-peer connection can be made if the respective network protection types comprise a common firewall.

15. The server of claim 12, wherein the respective network protection type of each communication device comprises a Network Address Translation.

16. The server of claim 15, wherein the server determines that a peer-to-peer connection can be made if the respective network protection types comprise a restrictive Network Address Translation.

17. The server of claim 12, wherein the server determines whether a peer-to-peer connection can be made during initiation of a communication session between the first and second communication devices.

18. The server of claim 11, wherein enabling the proxy to continue routing signals between the first and second communication devices comprises the proxy applying a session initiation protocol record route policy.

19. The server of claim 11, further comprising instructions for: if the peer-to-peer connection can be made, enabling the proxy to continue routing signals between the first and second communication devices if at least one criterion is satisfied.

20. The server of claim 19, wherein the at least one criterion comprises any one or more of:
   at least one of the first and second communication devices is associated with a predetermined user;
   at least one of the first and second communication devices is located within a predetermined network domain;
   a predetermined portion of signaling between the first and second communication devices is to be recorded; and
   at least one of the first and second communication devices requests a predetermined type of data.

21. A non-transitory computer readable storage medium comprising computer executable instructions for:
   connecting a first and a second communication devices to a proxy in the network, the proxy being configured for routing signals between the first and second communication devices;
   determining respective network protection types of the first and second communication devices;
   determining whether a peer-to-peer connection can be made between the first and second communication devices using the respective network protection types of the first and second communication devices;
   if the peer-to-peer connection can be made, enabling the first and second communication devices to communicate with each other via the peer-to-peer connection; and
   if the peer-to-peer connection cannot be made, enabling the proxy to continue routing signals between the first and second communication devices.

22. The non-transitory computer readable storage medium of claim 21, wherein the first and second communication devices execute a registration process with a server in the network, and wherein the server determines the respective network protection type of each communication device based on information received from the first and second communication devices during the registration process.

23. The non-transitory computer readable storage medium of claim 22, wherein the respective network protection type of each communication device comprises a firewall.

24. The non-transitory computer readable storage medium of claim 23, wherein the server determines that a peer-to-peer connection can be made if the respective network protection types comprise a common firewall.

25. The non-transitory computer readable storage medium of claim 22, wherein the respective network protection type of each communication device comprises a Network Address Translation.

26. The non-transitory computer readable storage medium of claim 25, wherein the server determines that a peer-to-peer connection can be made if the respective network protection types comprise a restrictive Network Address Translation.

27. The non-transitory computer readable storage medium of claim 22, wherein the server determines whether a peer-to-peer connection can be made during initiation of a communication session between the first and second communication devices.

28. The non-transitory computer readable storage medium of claim 21, wherein enabling the proxy to continue routing signals between the first and second communication devices comprises the proxy applying a session initiation protocol record route policy.

29. The non-transitory computer readable storage medium of claim 21, further comprising instructions for: if the peer-to-peer connection can be made, enabling the proxy to continue routing signals between the first and second communication devices if at least one criterion is satisfied.

30. The non-transitory computer readable storage medium of claim 29, wherein the at least one criterion comprises any one or more of:
   at least one of the first and second communication devices is associated with a predetermined user;
   at least one of the first and second communication devices is located within a predetermined network domain;
   a predetermined portion of signaling between the first and second communication devices is to be recorded; and
   at least one of the first and second communication devices requests a predetermined type of data.

* * * * *